Figure 1:
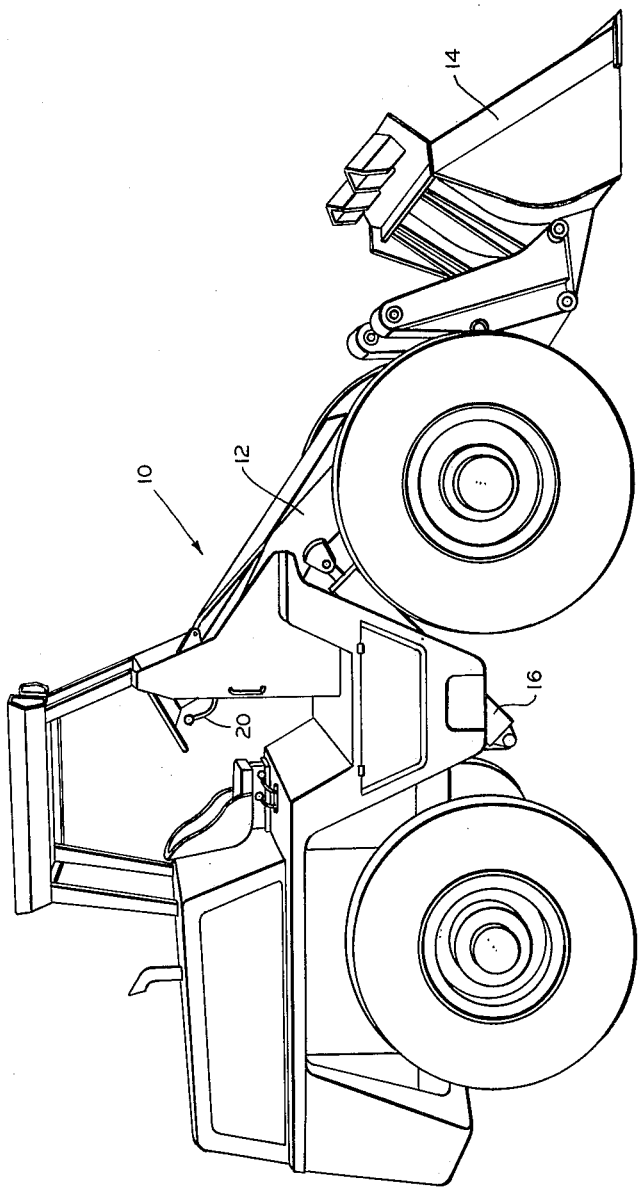

March 15, 1966 — M. L. CONRAD — 3,240,371
INCHING CONTROL SYSTEM FOR A VEHICLE
Filed July 28, 1964 — 3 Sheets-Sheet 1

INVENTOR
MARCUS L. CONRAD
BY
ATTORNEY

March 15, 1966     M. L. CONRAD     3,240,371
INCHING CONTROL SYSTEM FOR A VEHICLE
Filed July 28, 1964     3 Sheets-Sheet 2
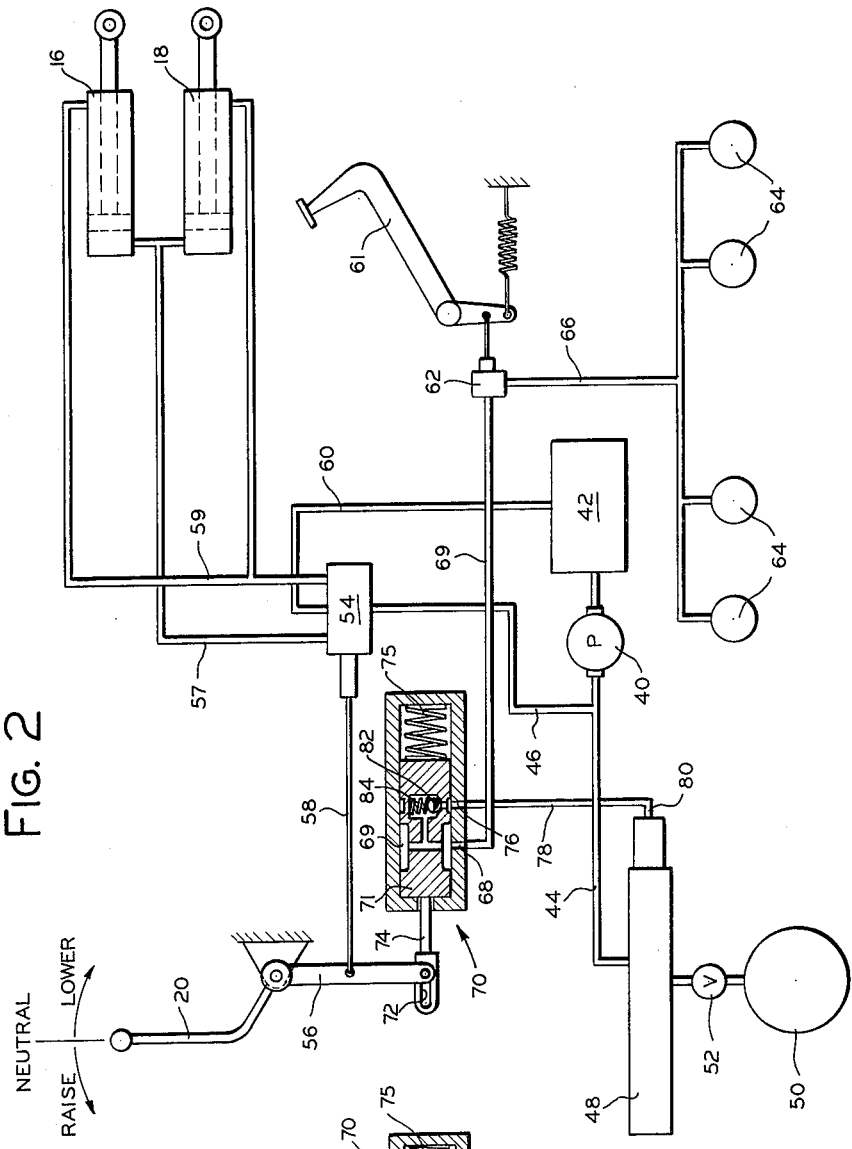
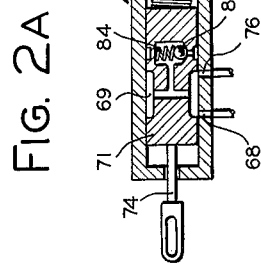
INVENTOR
MARCUS L. CONRAD
BY *Robert H. Johnson*
ATTORNEY

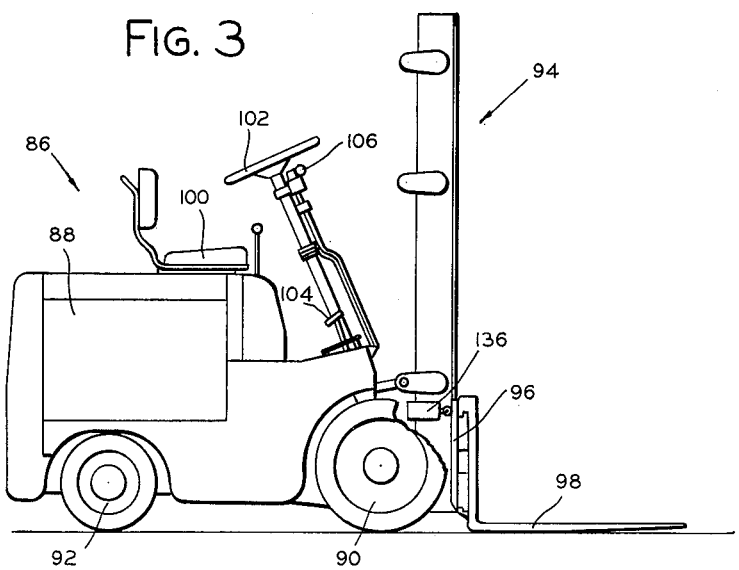
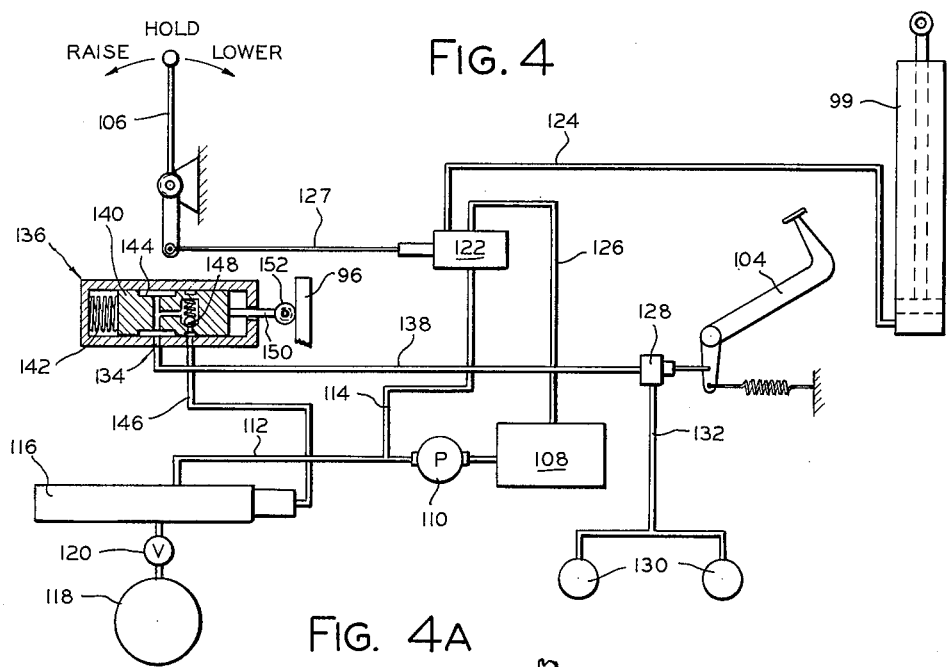
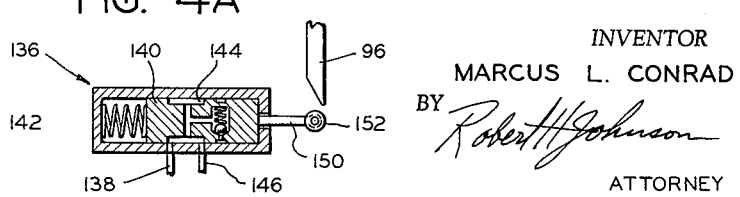

United States Patent Office 3,240,371
Patented Mar. 15, 1966

3,240,371
INCHING CONTROL SYSTEM FOR A VEHICLE
Marcus L. Conrad, Stevensville, Mich., assignor to Clark Equipment Company, a corporation of Michigan
Filed July 28, 1964, Ser. No. 385,678
14 Claims. (Cl. 214—140)

This invention relates to a fluid operated control system for a vehicle clutch, and more particularly to the transmission, brake and lift controls of a vehicle equipped with excavating or material handling means such as a bucket or fork mechanism.

In vehicles of this type, the engine ordinarily drives a pump which supplies the pressurized fluid necessary for the operation of the lift actuators. To operate the lift at high speed it is necessary that the engine of the vehicle be operated at high speed. Often it is desirable that the vehicle be stopped or moving at a relatively slower speed while the lift is being rapidly raised. To accomplish this, systems have previously been devised utilizing the vehicle braking system to disengage a fluid operated clutch in the transmission when the brakes are applied. These systems generally utilize a so-called "inching valve" in the fluid circuit of the fluid operated clutch to vary the fluid pressure on the clutch, and thus control clutch slippage, the inching valve being connected to and controlled by the brake pedal through either mechanical or hydraulic means. Thus, by operating the brake pedal and partially engaging and disengaging the clutch, the operator can "inch" the vehicle forward or backward while the lift is being rapidly raised.

However, such a system produces a disadvantage when the vehicle is working on an incline since it is desirable that the vehicle engine remain engaged to the traction wheels of the vehicle in such a situation to assist the brake in stopping or retarding the vehicle. The system also may be detrimental in normal operation since the clutch is disengaged as soon as the brakes are applied, whether or not the lift is being operated. Thus, the vehicle loses the braking power of the engine resulting in greater brake wear.

To overcome these defects, it has been proposed previously to provide a manually operated valve in the hydraulic line between the brake master cylinder and the inching valve whereby the operator could manually close the hydraulic line, thus rendering the inching valve and clutch disconnect inoperable. It has also been proposed that the vehicle be provided with two brake pedals whereby the actuation of the first pedal operates the brakes of the vehicle only and the actuation of the second pedal operates both the brakes of the vehicle and the inching valve. However, both of the above-mentioned systems have the drawback of introducing the human element into the system, relying on the operator to actuate the shut off valve or to select the correct brake pedal. In the operation of such a vehicle, it is ordinarily desirable that the clutch be disengaged only when the brakes are being applied and the lift is simultaneously being raised. The present invention accomplishes this automatically by introducing valve means operated by the lift control lever or by the lift mechanism itself whereby pressure from the brake master cylinder is transmitted to operate the inching valve only when the boom arm control lever is in the "raise" position or the lift mechanism is elevated. Thus, the drawbacks of the prior systems are overcome without introducing the human element into the system.

Accordingly, an object of the present invention is to provide an improved fluid operated vehicle clutch control system.

A further object of the present invention is to provide an improved vehicle clutch control system in which the clutch is automatically disengaged when the vehicle's brakes are applied and the lift mechanism is simultaneously being raised. A further object of the present invention is to provide an improved vehicle clutch control system in which the clutch is automatically disengaged when the vehicle's brakes are applied and the lift mechanism has been raised a predetermined amount.

A still further object of the present invention is to provide valve means of simple and rugged construction, responsive to the boom arm control lever of a vehicle for controlling the pressure from the brake master cylinder of the vehicle to the inching valve.

The foregoing and other objects and advantages of the invention will appear more fully from a consideration of the accompanying drawing and the detailed description which follows. It is to be expressly understood, however, that the drawing is for the purpose of illustration and is not to be construed as defining the limits of the invention.

In the drawing:

FIGURE 1 is a perspective view of one type of vehicle in which the present control system may be used, FIGURE 2 is a schematic representation of the fluid operated boom, clutch and brake controls of a vehicle such as shown in FIG. 1, incorporating the control system of the present invention, FIGURE 2A is a schematic representation of the control valve of FIG. 2 in a different operating position, FIGURE 3 is a side elevational view of another type of vehicle in which the present control system may be used, FIGURE 4 is a schematic representation of the fluid circuitry of a vehicle as shown in FIG. 3, incorporating the control system of the present invention, and FIGURE 4A is a schematic representation of the control valve of FIG. 4 in a different operating position.

Referring now to the drawing, and in particular to FIG. 1, there is shown a tractor shovel 10 which carries a pivoted boom 12 at the end of which is mounted a bucket 14. Boom 12 is raised and lowered by boom actuators 16 and 18 (only one of which is visible in FIG. 1), said actuators being controlled by the operator by means of boom control lever 20.

Referring now to FIG. 2, fluid is drawn from a reservoir 42 by an engine driven pump 40 and is supplied by it under pressure to conduits 44 and 46. Conduit 44 transmits the pressurized fluid to inching valve 48 which controls the supply of pressurized fluid to the regular on-off control valve 52 which in turn controls the supply of pressurized fluid to a fluid actuated clutch which is indicated schematically at 50. Actually, valve 52 may be a direction selector if desired and there may be two clutches, forward and reverse, instead of single clutch 50. U.S. Patent 2,950,734 illustrates such an arrangement. The said patent also discloses and claims an inching valve which could be used as valve 48 of the present system.

Conduit 46 supplies fluid pressure to boom control valve 54 which controls the flow of fluid under pressure through conduits 57 and 59 to boom actuators 16 and 18. Conduit 60 returns the fluid from boom control valve 54 to reservoir 42.

Boom control valve 54 is operated by boom control lever 20 through member 56 and link 58. Boom control lever 20 is shown in the neutral position. To raise the boom the control lever 20 is moved to the left and to lower the boom it is moved to the right.

The actuation of brake pedal 61 operates brake master cylinder 62 which supplies fluid under pressure to brake wheel cylinders 64 through brake line 66 to apply the brakes on the vehicle. Brake master cylinder 62 also directs fluid under pressure when the brake pedal is operated through conduit 69 to inlet 68 of control valve 70.

Control valve 70 is operated by boom control lever 20 through member 56 which is connected to member 74 of control valve 70 by a lost motion connection which includes slot 72. When the control valve 70 is open, as shown in FIG. 2A, in which condition annular space 69 in spool member 71 of the valve connects inlet 68 to outlet 76, and the brake pedal 61 is operated, fluid pressure from the master cylinder 62 is transmitted through the control valve 70 to the brake pressure inlet 80 of inching valve 48 via conduit 78. Normally, control valve 70 is held in the closed position illustrated in FIG. 2 by return spring 75. Control valve 70 includes a ball check valve member 82 biased by spring 84 whereby pressure in conduit 78 may be relieved when control valve 70 is moved to the closed position and fluid pressure from brake master cylinder 62 is thereafter decreased.

In operation, when boom 12 is not being moved, the boom control lever is in neutral position, as shown in FIG. 2, and control valve 70 is closed. When the operator depresses brake pedal 61 under these conditions, fluid pressure from brake master cylinder 62 is not transmitted through control valve 70 and flows only to the brake wheel cylinders 64. Thus, since clutch 50 is not disconnected, the vehicle retains the braking power of the engine when the brakes are applied. When boom control lever 20 is moved to the right to the "lower" position, link 56 slides in slot 72 of member 74, control valve 70 remaining closed. However, when boom control handle 20 is moved to the left to the "raise" position, link 56 moves member 74 opening control valve 70 (FIG. 2A). When the operator now depresses brake pedal 61, fluid pressure from brake master cylinder 62 passes through control valve 70 to operate inching valve 48 as well as brake wheel cylinder 64. Since inching valve 48 controls the engagement of clutch 50, the operator may now run the engine and consequently pump 40 and boom actuators 16 and 18 at any desired speed, while the controlled slippage of clutch 50 permits the operator to "inch" the vehicle as he desires.

FIG. 3 shows an industrial lift truck 86 with which the embodiment of my invention shown in FIG. 4 is used. Lift truck 86 includes a body 88 which is supported by a forward pair of drive wheels 90 and a rear pair of dirigible wheels 92. Mounted at the forward end of lift truck 86 is a lift upright 94 which includes a vertically movable carriage 96 that carries a pair of forwardly extending fork arms 98 which support loads that are carried by truck 86. The carriage 96 is connected to a vertically disposed single acting fluid motor 99 (FIG. 4) by means of a sprocket and chain arrangement, not shown, so that extension of motor 99 raises carriage 96. Lift truck 86 also includes an operator's station at which is located a seat 100, a steering control wheel 102 and other conveniently located controls including a brake pedal 104 and a control lever 106 for controlling raising and lowering of carriage 96.

Turning now to FIGS. 4 and 4A, a second embodiment of my invention is shown. The clutch control system shown in FIG. 4 includes a reservoir 108 from which fluid is drawn by means of a pump 110, the pump supplying pressurized fluid to conduits 112 and 114. Conduit 112 supplies pressurized fluid to an inching valve 116, valve 116 supplying pressurized fluid, in turn, to a clutch 118 of the transmission for lift truck 86 via an on-off valve 120.

Conduit 114 directs pressurized fluid to a lift control valve 122 from which fluid is either directed to the bottom of single acting motor 99 via a conduit 124, or returned to reservoir 108 via conduit 126. Control lever 106 is connected to control valve 122 by means of a link 127 so that when lever 106 is in the "hold" position conduit 114 is connected to conduit 126, whereby fluid from pump 110 is returned to reservoir 108. When lever 106 is actuating toward the left conduit 114 is connected to conduit 124, thereby causing motor 99 to extend with the result that carriage 96 moves upwardly. When lever 106 is moved toward the right conduit 124 is connected with conduit 126, thus permitting motor 99 to retract, whereby carriage 96 is lowered.

Brake pedal 104 is connected to a master brake cylinder 128 so that depression of brake pedal 104 generates pressurized fluid which is directed to brake wheel cylinders 130 via conduit 132 and directed to the inlet port 134 of a normally closed valve 136 via a conduit 138.

Valve 136 inclues a spool member 140 which is biased toward the right, as viewed in FIG. 4, by means of a compression spring 142. Spool 140 includes an annular groove 144 which in one position of spool member 140 serves to connect conduit 138 with a conduit 146 which connects with inching valve 116. A one-way check valve 148 is disposed in spool member 140 and connects with groove 144 so that under certain operating conditions the pressure in conduit 146 may be relieved. Connected to one end of spool member 140 is an outwardly extending rod 150 to which a roller 152 is rotatably connected at the outer end thereof. Valve 136 is connected to lift upright 94, see FIG. 3, and disposed so that roller 152 engages, under the bias of spring 142, the back side of carriage 96 in the lowered position thereof. When carriage 96 is in the lowered position, as shown in FIG. 3, spool 140 of valve 136 is maintained in the position shown in FIG. 4; however, after carriage 96 has been elevated a predetermined distance, then roller 152 no longer engages carriage 96 with the result that spring 142 actuates spool member 140 to the position shown in FIG. 4A. In this position conduits 138 and 146 are connected so that pressurized fluid generated by master cylinder 128 is conducted to inching valve 116 to actuate it.

Turning now to the operation of the embodiment of my invention shown in FIG. 4, it will be assumed that lift truck 86 is being operated with the carriage substantially in the position shown in FIG. 3. Under this condition of operation roller 152 engages carriage 96, and so valve 136 is maintained in the position shown in FIG. 4. Under these operating conditions, depression of brake pedal 104 does not actuate inching valve 116 because pressurized brake fluid is blocked by valve 136. Consequently, the engine is not disengaged from drive wheels 90 during braking of the lift truck, such operation being highly desirable when it is desired to brake the lift truck on a downward incline, for example. The operator is stacking at an elevation loads carried on fork arms 98 and carriage 96 is raised sufficiently so that roller 152 no longer engages carriage 96, valve 136 will be in the position shown in FIG. 4A. Under these operating conditions, when the operator depresses brake pedal 104 pressurized fluid generated by master cylinder 128 is conducted to inching valve 116 via conduit 138, groove 140 and conduit 146. The pressurized fluid conducted to inching valve 116 actuates it, depending upon the pressure of the fluid conducted thereto, to slip or disengage clutch 118, as desired. Thus, the operator may operate the engine of the truck 86 at high speeds in order to provide large quanties of pressurized fluid to motor 99 for rapid operation of lift upright 94 and at the same time move lift truck 86 slowly forwardly or rearwardly by controlling the engagement of clutch 118.

While I have shown only two embodiments of my invention, it is understood that the instant invention is not limited to any particular form of construction. Moreover, other changes and modifications of the novel control system contemplated herein may be made by those skilled in the art without departing from the scope of the instant invention.

I claim:

1. For use in a vehicle equipped with a lift mechanism and having fluid pressure operated clutch means for interrupting the vehicle drive train, a source of pressurized fluid, conduit means for transmitting pressurized fluid from the source of the clutch means, and brake means; the combination comprising valve means in the conduit means for regulating the pressure of fluid supplied to the clutch means and means responsive jointly to actuation of the brake means and an operating condition of the lift mechanism for actuating the said valve means.

2. For use in a vehicle having a lift mechanism, a transmission including fluid pressure operated clutch means, a source of pressurized fluid, conduit means for conducting pressurized fluid from the source to the clutch means, and brake means; the combination comprising an inching valve in the conduit means for regulating the pressure of fluid supplied to the clutch means, means for actuating the said inching valve upon operation of the brake means, and means responsive to an operating condition of the lift mechanism for rendering the said actuating means ineffective.

3. For use in a vehicle a lift mechanism, a transmission including fluid pressure operated clutch means, a source of pressurized fluid, conduit means for conducting pressurized fluid from the source to the clutch means, and brake means; the combination comprising an inching valve in the conduit means for regulating the pressure of fluid supplied to the clutch means, means for actuating the said inching valve to decrease the pressure of fluid being supplied to the clutch means upon application of the brake means, and means responsive to an operating condition of the lift mechanism for preventing actuation of the said inching valve upon application of the brake means.

4. For use in a vehicle having a lift mechanism, brake means and a transmission including fluid pressure operated clutch means, a clutch control comprising a source of pressurized fluid, conduit means for conducting pressurized fluid from the said source to the clutch means, an inching valve in the said conduit means for regulating the pressure of fluid supplied to the clutch means, means for actuating the said inching valve to reduce the pressure of fluid supplied to the clutch means upon application of the brake means, and means responsive to an operating condition of the lift mechanism for rendering ineffective the said actuating means.

5. For use in a vehicle having a lift mechanism, a transmission including fluid pressure operated clutch means, a source of pressurized fluid, conduit means for conducting pressurized fluid from the source to the clutch means, and brake means; the combination comprising valve means in the conduit means for regulating the pressure of fluid supplied to the clutch means and means responsive jointly to actuation of the brake means and the lift mechanism for actuating the said valve means.

6. For use in a vehicle having a lift mechanism, a transmission including fluid pressure operated clutch means, a source of pressurized fluid, conduit means for conducting pressurized fluid from the source to the clutch means, and brake means; the combination comprising valve means, in the conduit means for regulating the pressure of fluid supplied to the clutch means and means responsive jointly to application of the brake means and the position of the lift mechanism for actuating the said valve means.

7. For use in a vehicle having a lift mechanism, a transmission including fluid pressure operated clutch means, a source of pressurized fluid, conduit means for conducting pressurized fluid from the source to the clutch means, and brake means; the combination comprising an inching valve in the conduit means for regulating the pressure of fluid supplied to the clutch means, means for actuating the said inching valve upon operation of the brake means, and means responsive to actuation of the lift mechanism for rendering ineffective the said actuating means.

8. For use in a vehicle having a lift mechanism, a transmission including fluid pressure operated clutch means, a source of pressurized fluid, conduit means for conducting pressurized fluid from a source to a clutch means, and brake means; the combination comprising an inching valve in the conduit means for regulating the pressure of fluid supplied to the clutch means, means for actuating said inching valve to reduce the pressure of fluid supplied to the clutch upon application of the brake means, and means responsive to the position of the lift mechanism for preventing actuation of the said inching valve upon application of the brake means.

9. In a vehicle having a lift mechanism, brake means and a transmission including fluid pressure operated clutch means, a clutch control comprising a source of pressurized fluid, conduit means for conducting pressurized fluid from the said source to the clutch means, an inching valve in the said conduit means for regulating the pressure of fluid supplied to the clutch means, means for actuating the said inching valve to reduce the pressure of fluid supplied to the clutch means upon application of the brake means, and means responsive to actuation of the lift mechanism for rendering ineffective the said actuating means.

10. For use in a tractor shovel having an elevatable boom, fluid motor means for elevating the boom, fluid brake means and a transmission including fluid pressure operated clutch means, a clutch control comprising a source of pressurized fluid, first conduit means for conducting pressurized fluid from the said source to the clutch means, an inching valve in the said first conduit means for regulating the pressure of fluid supplied to the clutch means, second conduit means for conducting pressurized fluid from the said source to the fluid motor means, a control valve in the said second conduit means for controlling fluid communication between the said source and the fluid motor means, third conduit means for conducting pressurized brake fluid from the brake means to the said inching valve to actuate the said inching valve, and a normally closed valve in the said third conduit means for controlling fluid communication between the brake means and the said inching valve, and operator control means for jointly actuating the said control valve and the said normally closed valve, said operator means being connected to the said control valve and normally closed valve so that when the said control valve is actuated to direct pressurized fluid to the fluid motor means the normally closed valve is actuated to an open position, whereby upon application of the brake means pressurized fluid will be directed to said inching valve to actuate it.

11. For use in a vehicle having a left mechanism, a transmission including fluid pressure operated clutch means, a source of pressurized fluid, conduit means for conducting pressurized fluid from the source to the clutch means, and brake means; the combination comprising an inching valve in the conduit means for regulating the pressure of fluid supplied to the clutch means, means for actuating the said inching valve upon operation of the brake means, and means responsive to elevation of the left mechanism past a predetermined point for rendering ineffective the said actuating means.

12. For use in a vehicle having a lift mechanism, a transmission including fluid pressure operated clutch means, a source of pressurized fluid, conduit means for conducting pressurized fluid from the source to the clutch means, and brake means; the combination comprising an inching valve in the said conduit means for regulating the pressure of fluid supplied to the clutch means, means for actuating the said inching valve to reduce the pressure of fluid supplied to the clutch means upon application of the brake means, and means responsive to elevation of the lifting mechanism past a predetermined point for preventing actuation of the said inching valve upon application of the brake means.

13. For use in a vehicle having a lift mechanism, brake means and a transmission including fluid pressure operated clutch means, the combination comprising a source of pressurized fluid, conduit means for conducting pressurized fluid from the said source to the clutch means, an inching valve in the said conduit means for regulating the pressure of fluid supplied to the clutch means, means for actuating the said inching valve to reduce the pressure of fluid supplied to the clutch means upon application of the brake means, and means responsive to the elevation of the lift mechanism past a predetermined point for preventing actuation of the said inching valve upon application of the brake means.

14. For use in a lift truck having load lifting means including a vertically elevatable carriage and fluid motor means, a transmission having fluid pressure operated clutch means, and brake means; a clutch control comprising a source of pressurized fluid, first conduit means for conducting pressurized fluid from the said source to the clutch means, an inching valve in the said first conduit means for regulating the pressure of fluid supplied to the clutch means, second conduit means for conducting pressurized fluid from the said source to the fluid motor means, a control valve in the said second conduit means for controlling the communication of the said source with the fluid motor means, a third conduit means for conducting pressurized brake fluid from the brake means to the said inching valve, and a normally closed valve in the said third conduit means which is responsive to the position of the carriage, said normally closed valve opening when the carriage is raised past a predetermined elevation.

References Cited by the Examiner

UNITED STATES PATENTS

| | | | |
|---|---|---|---|
| 1,301,643 | 4/1919 | Blank | 212—39 X |
| 1,509,951 | 9/1924 | Hukill | 192—13 X |
| 2,842,273 | 7/1958 | Granryd | 214—140 |
| 2,917,143 | 12/1959 | Jenney | 192—13 |
| 2,972,906 | 2/1961 | Schroeder | 74—732 |
| 2,990,925 | 7/1961 | Bernotas | 192—13 |
| 3,050,165 | 8/1962 | Day et al. | 192—13 |

GERALD M. FORLENZA, *Primary Examiner.*